(12) United States Patent
Simer

(10) Patent No.: US 12,401,308 B1
(45) Date of Patent: Aug. 26, 2025

(54) DEVICE FOR GENERATION AND DISTRIBUTION OF ELECTRICAL POWER

(71) Applicant: Matthew H. Simer, San Jose, IL (US)

(72) Inventor: Matthew H. Simer, San Jose, IL (US)

( * ) Notice: Subject to any disclaimer, the term of this patent is extended or adjusted under 35 U.S.C. 154(b) by 168 days.

(21) Appl. No.: 18/369,058

(22) Filed: Sep. 15, 2023

(51) Int. Cl.
H02J 7/14 (2006.01)
H02P 27/06 (2006.01)

(52) U.S. Cl.
CPC ..................... H02P 27/06 (2013.01)

(58) Field of Classification Search
CPC ...... H02J 7/1438; H02J 3/322; H02K 49/108; H02P 27/06
See application file for complete search history.

(56) References Cited

U.S. PATENT DOCUMENTS

| | | | |
|---|---|---|---|
| 11,183,843 B1* | 11/2021 | Cooper | H02J 3/322 |
| 2018/0198360 A1 | 7/2018 | Featherly et al. | |
| 2018/0331611 A1 | 11/2018 | Featherly et al. | |
| 2020/0204056 A1* | 6/2020 | Featherly | H02J 7/1438 |
| 2021/0111617 A1* | 4/2021 | Mitri | H02K 49/108 |

* cited by examiner

Primary Examiner — Cortez M Cook
(74) Attorney, Agent, or Firm — Brie A. Crawford; Crawford Intellectual Property Law LLC

(57) ABSTRACT

A device for generation and distribution of electrical power has an electric motor which provides kinetic power to an electric generator. The electric motor is powered by a plurality of batteries which are operably connected to it. The electric generator provides power to a series of charge controllers and inverters which can provide power either to recharge the plurality of batteries and/or to the load source. A first circuit has the plurality of batteries powering the electric motor to provide kinetic power to the electric generator. The second circuit can be used to either recharge the plurality of batteries or provide power to the electric motor to provide kinetic power to the electric generator.

20 Claims, 2 Drawing Sheets

DEVICE FOR GENERATION AND DISTRIBUTION OF ELECTRICAL POWER

This invention relates to a device for generation and distribution of electrical power, and more particularly, to a device for generation and distribution of electrical power which generates electrical power and then, distributes it for use for household/building purposes or for distribution to the electrical power grid.

BACKGROUND OF THE INVENTION

Houses or other buildings (hereinafter "houses") require electrical power for functioning of many important components or appliances. Generation of electrical power is important for houses which are off the electrical power grid. These houses still need electrical power, but may not have access to it due to remoteness of a location or due to an emergency situation such as a hurricane, earthquake, tornado, flooding, or other shut down of the electrical power grid. Providing access to power to houses in these locations or these situations through an apparatus that generates and distributes electrical power will be a useful invention.

Electrical power demand is increasing. There is increased demand due to the charging of electric vehicles and a technology-based society which requires electrical power to operate computers and other electronic devices. An apparatus that generates and distributes electrical power will be a useful invention.

SUMMARY OF THE INVENTION

An objective of the present invention is the provision of a device for generation and distribution of electrical power which can generate and distribute electrical power independently of the electrical power grid.

Another objective of the present invention is the provision of a device for generation and distribution of electrical power which can generate and distribute electrical power to a house that is not connected to the electrical power grid.

A still further objective of the present invention is the provision of a device for generation of electrical power that can generate and distribute electrical power to houses in an emergency situation where power from the electrical power grid is not available.

Other objectives and advantages of the invention will become apparent from the description of the preferred embodiments herein.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

Figure 1:
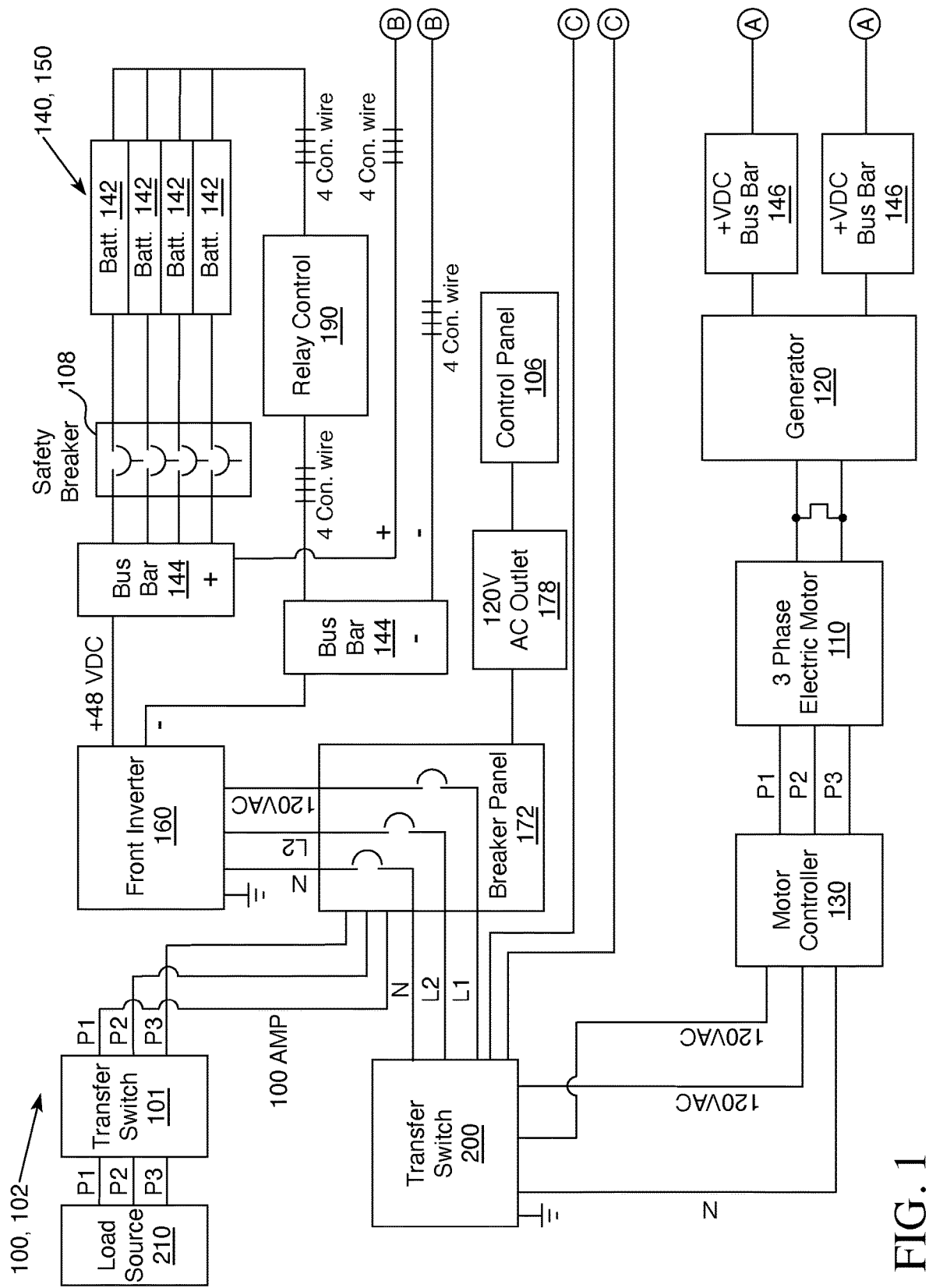
FIG. 1 depicts a schematic diagram of the device for generation and distribution of electrical power 100 of this invention.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, can be used with respect to the drawings. These and similar directional terms are not to be construed to limit the scope of the invention in any manner. The words attach, connect, couple, and similar terms with their inflectional morphemes do not necessarily denote direct or intermediate connections, but can also include connections through mediate elements or devices.

All measures of voltage and current in the following description of the preferred embodiment are meant to be exemplary and not limit the disclosure in any manner.

Throughout the drawings, the term 4 Con. wire is used. This is an abbreviation for 4 control wires and while only one wire is shown in the illustration, there are in actuality four different wires connected between the same two points as the depicted wire.

Figure 2:
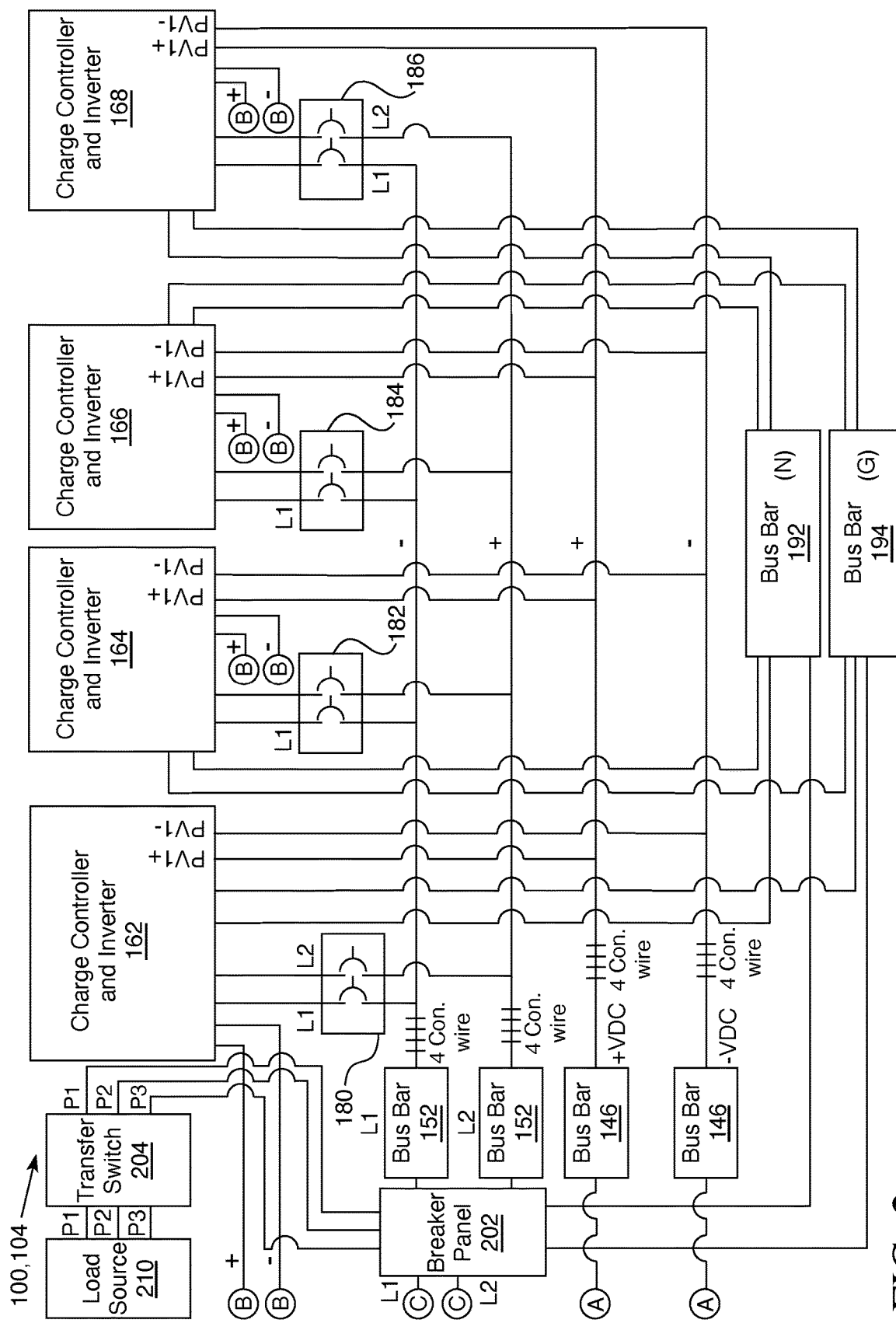
FIG. 2 depicts a schematic diagram of the device for generation and distribution of electrical power 100 of this invention.

Now adding FIG. 1 and FIG. 2 to the consideration, the structure and function of device 100 can be clearly seen. Device 100 has first circuit 102 and second circuit 104. Device 100 also has a control panel 106. Control panel 106 is connected to outlet 178 (which is preferably, but not required, a 120 volt, alternating current outlet) which is connected to breaker panel 172 (sometimes referred to as a "first breaker panel") and breaker panel 172 provides electrical power (hereinafter "power") to control panel 106. Control panel 106 monitors and controls front inverter 160, inverters and charge controllers 162, 164, 166, and 168, batteries 142, electric generator 120, and motor controller 130. Control panel 106 monitors the function of device 100 and has a cat 5 data connection and Wi-Fi connection (or any other suitable internet connection) to allow internet access by an electronic device (phone, computer, tablet, or any other suitable electronic device) for the monitoring and controlling of device 100.

First Circuit 102

Device 100 is started by powering on/off switch connected to safety breaker 108 (not shown) and batteries 142 of battery bank 140 have an internal switch to activate them. Batteries 142 of battery bank 140 are connected in parallel and provide a constant flow of energy to start the device 100 and also store energy for future use. Battery bank 140 has battery management system 150. Battery management system 150 protects the batteries 142 from over-charging. Battery management system 150 allows a charge at 48 volts direct current (hereinafter "VDC"), with up to 200 amperes (hereinafter "amps") and a discharge at 48 VDC with up to 200 amps drawing or discharging at a time per battery 142 while receiving up to a charge of 48 VDC and 200 amps per battery 142 to charge battery bank 140 and to operate device 100.

Battery bank 140 is preferably a graphene super conductor battery bank that consists of four batteries 142 at 48 VDC, 100 amps minimum with 200 amps maximum. However, any type of batteries 142 can be used and up to nine batteries can be used.

Once running, device 100 is powered by charge controllers and inverters 162, 164, 166, and 168 (of the second circuit 104). Once charge controllers and inverters 162, 164, 166, and 168 take over powering device 100, batteries 142 of battery bank 140 standby as a back-up power source for device 100.

Power from batteries 142 of battery bank 140 flows through positively charged wires through safety breaker 108 at 48 VDC, 100 amps minimum and up to 200 amps maximum to a positively charged battery bus bar 144. Power from batteries 142 also flows through negatively charged wires (four control wires are depicted in FIG. 1 as denoted as 4 Con. wire) at 48 VDC, 100 amps minimum and up to 200 amps maximum to relay control 190. From relay control 190 power flows at 48 VDC, 100 amps minimum and up to 200 amps maximum to a negatively charged battery bus bar 144 (positively and negatively charged bus bars 144 are sometimes referred to as "first set of bus bars"). Battery bank 140 has a two battery 142 minimum, but can have up to nine batteries 142.

Relay control 190 monitors battery bank 140. Relay control 190 can turn on and off the charging of batteries 142 based on current power storage. Safety breaker 108 can cut off power from the batteries 142 to the remainder of device 100 in case of an emergency, natural disaster, or failure of device 100.

From positively and negatively charged battery bus bars 144, power flows to front inverter 160 at 48 VDC, 100 amps minimum and up to 200 amps maximum. Front inverter 160 inverts power from 48 VDC to 240 volts alternating current (hereinafter "VAC") (L1 and L2 exiting from front inverter 160 are connected in parallel so the combination of each at 120 VAC creates 240 VAC). Power flows to a breaker panel 172 (which is preferably a 60 amp breaker panel) at 240 VAC and 100 amps minimum and up to 200 amps maximum. From breaker panel 172, power can flow to a transfer switch 101 (sometimes referred to as "first transfer switch") at 240 VAC, 100 amps minimum and up to 200 amps maximum. Transfer switch 101 disconnects power from the power grid to the load source 210 and allows electric generator 120 to operably connect to and power the load source 210 which can be the home or other building, appliance, or other power receiver (hereinafter "load source"). The P1, P2, and P3 lines connect to the breaker panel or sub-panel for the load source 210 and power transfers to the breaker panel or sub-panel for the load source 210 at 240 VAC, 100 amps minimum and up to 200 amps maximum.

Transfer switch 101 can also transfer power not used by the load source 210 to the power grid at 240 VAC, 100 amps minimum and 200 amps maximum.

Power from breaker panel 172 can also be transferred to transfer switch 200 (sometimes referred to as "second transfer switch") at 240 VAC, 100 amps maximum. Transfer switch 200 can transfer power to motor controller 130 at 240 VAC with a maximum of 100 amps. Motor controller 130 converts the 240 VAC to triple phase. From motor controller 130, power can be transferred in triple phase at 360 VAC to electric motor 110. Electric motor 110 rotates and converts electrical power into kinetic energy which operates electric generator 120 which converts kinetic energy back into electrical power. Power flows from electric generator 120 at up to a maximum of 450 VDC and is transferred through positively charged wire to positive bus bar 146 and through negatively charged wire to negative bus bar 146 (sometimes referred to as the "second set of bus bars").

It is preferred, but not required, that electric motor 110 is a three phase electric motor. However, any suitable electric motor 110 can be used and is encompassed by this disclosure.

Electric motor 110 which is preferably a 15 horsepower electric motor, but can range between 5 horsepower and 30 horsepower, three phase with an operational 3000 revolutions per minute (RPM). The RPM of electric motor 110 can range between 1000 RPM and 3000 RPM.

Electric generator 120 is preferably a 30 kilowatt (KW) permanent magnet generator, but can be up to a 50 KW permanent magnet generator. Any suitable generator can be used and all suitable generators are encompassed by this disclosure.

Second Circuit 104

Power from positive and negative bus bars 146 flows to charge controller and inverters 162, 164, 166, and 168 at up to 450 VDC (as denoted by the letter A in FIG. 1 and FIG. 2). Four positively charged control wires exit from the positively charged bus bar 146 and four negatively charged control wires exit from the negatively charged bus bar 146 (as depicted by 4 Con. wire in FIG. 2). Charge controller and inverters 162, 164, 166, and 168 are connected in parallel and receive up to 450 VDC, and a maximum of 25 amps per charge controller and inverter so 100 amps for the four charge controllers and inverters 162, 164, 166, and 168 in the depicted embodiment. Charge controller and inverters 162, 164, 166, and 168 convert power to 48 VDC, 100 amp per charge controller and inverter. In the depicted embodiment four charge controllers 162, 164, 166, and 168 are shown, but up to nine charge controllers and inverters can be utilized and are encompassed by this disclosure.

Charge controllers and inverters 162, 164, 166, and 168 have four wires exiting from each of them. Power flows from each charge controller and inverter 162, 164, 166, and 168 at 240 VAC, 25 amp per 162, 164, 166, and 168 so 100 amp output in combination to neutral (N) bus bar 192, to bus bar 194 which is the ground (G), and to charger controller and inverter breaker panels 180, 182, 184, and 186 through line 1 and line 2 (and if the maximum number of nine charge controllers and inverters are used they, in combination, put out 240 VAC, and 225 amps). Breaker panels 180, 182, 184, and 186 can be individual breaker panels as shown or can be four independent sub-panels contained within one breaker box.

From breaker panels 180, 182, 184, and 186, power flows from line 1 to line 1 bus bar 152 at 120 VAC, and 25 amps per charge controller and inverter 162, 164, 166, and 168 so 100 amps. From breaker panels 180, 182, 184, and 186 power flows from line 2 at 120 VAC and 25 amps per charge controller and inverter 162, 164, 166, and 168 so 100 amps to line 2 bus bar 152 (the line 1 and line 2 bus bars 152 are sometimes referred to as the "third set of bus bars There is a line 1 and line 2 coming from each breaker panel 180, 182, 184, and 186 (as indicated by 4 Con. wire in FIG. 2).

From the L1 and L2 legs of bus bars 152, power is transferred at 240 VAC, 100 to 225 amps to breaker panel 202 (sometimes referred to as a "second breaker panel"). Power from breaker panel 202 flows at 240 VAC, 100 to 225 amps to transfer switch 204 (sometimes referred to as "third transfer switch").

Transfer switch 204 disconnects power from the power grid to the load source 210 and allows electric generator 120 to connect to and power the load source 210. The P1, P2, and P3 lines connect to the breaker panel or sub-panel for the load source 210 and power transfers to the breaker panel or sub-panel for the load source at 240 VAC, 100 amps minimum and up to 200 amps maximum.

Transfer switch 204 (sometimes referred to as "third transfer switch") can also transfer power not used by the load source 210 to the power grid at 240 VAC, 100 amps minimum and 200 amps maximum.

From each charge controller and inverter 162, 164, 166, and 168 a second positive and negative wire exit and connect to the positive and negative bus bars 144 (as denoted by B in FIG. 1 and FIG. 2). Power is transferred at 48 VDC, 100 amps minimum to 200 amps maximum to the positive and negative bus bars 144. Each charge controller and inverter 162, 164, 166, and 168 has a positive and negative wire exiting from it, four control wires enter each the positive bus bar 144 and the negative bus bar 144 (as depicted as 4 Con. wire in FIG. 1). From the positive and negative bus bars 144, power can be transferred at 48 VDC, with a minimum of 100 amps and up to 200 amps maximum to front inverter 160 which then travels through the rest of first circuit 102.

Or, power can flow from the positive bus bar 144 to the safety breaker 108 at 48 VDC, with a minimum of 100 amps and up to 200 amps maximum. Then power flows from the safety breaker 108 to the batteries 142 at 48 VDC, with a minimum of 100 amps and up to 200 amps maximum.

Or, power can flow from the negative bus bar 144 to the relay control 190 at 48 VDC, with a minimum of 100 amps and up to 200 amps maximum. Then power flows from the relay control 190 to the batteries 142 at 48 VDC, with a minimum of 100 amps and up to 200 amps maximum. This allows the charge controllers and inverters 162, 164, 166, and 168 the ability to charge batteries 142. Relay control 190 monitors the batteries 142 and can divert the transfer of power from the positive and negative bus bars 144 to the front inverter 160 when the batteries 142 are fully charged.

Transfer switch 200 is connected to both the motor controller 130 and breaker panel 202 (See C on FIG. 1 and FIG. 2). Transfer switch 200 allows one circuit 102 or 104 of system 100 to take over when manually flipped so that one circuit 102 or 104 of system 100 can provide power if the other side is disabled. In an emergency, transfer switch 200 is manually flipped. This allows a user to shut off either the first circuit 102 or the second circuit 104 if there is a problem in system 100.

Transfer switch 200 can be switched so that electric motor 110 is powered by the flow of power from front inverter 160 running off batteries 142 or transfer switch 200 can be switched so that electric motor 110 is powered by the charge controllers and inverters 162, 164, 166, and 168.

While various embodiments and aspects of the present invention have been described above, it should be understood that they have been presented by way of example only, and not limitation. Thus, the breadth and scope of the present invention should not be limited by any of the above exemplary embodiments.

This application—taken as a whole with the abstract, specification, claims, and drawings being combined—provides sufficient information for a person having ordinary skill in the art to practice the invention as disclosed herein. Any measures necessary to practice this invention are well within the skill of a person having ordinary skill in this art after that person has made a careful study of this disclosure.

Because of this disclosure and solely because of this disclosure, modification of this device can become clear to a person having ordinary skill in this particular art. Such modifications are clearly covered by this disclosure.

What is claimed and sought to be protected by Letters Patent is:

1. A device for generation and distribution of electrical power comprising:
    a) the device having an electric motor that powers an electric generator, wherein the electric motor is controlled by a motor controller;
    b) a plurality of batteries being operatively connected to a front inverter, wherein the front inverter is operatively connected to the electric motor;
    c) a plurality of charge controllers and inverters being operatively connected to both the plurality of batteries and the electric motor, wherein the plurality of batteries can be charged by the plurality of charge controllers and inverters, further wherein the electric motor can be powered by the plurality of charge controllers and inverters; and
    d) the electric generator being operatively connected to the load source, wherein the electric generator is configured to supply power to the load source.

2. The device of claim 1 further comprising:
    a) the device having a first circuit and a second circuit;
    b) the first circuit comprising:
        i) the plurality of batteries operatively connected to the front inverter;
        ii) the front inverter operatively connected to a second transfer switch;
        iii) the second transfer switch electrically connected to the motor controller;
        iv) the motor controller electrically connected to the electric motor;
        v) the electric motor kinetically connected to the electric generator;
    c) the second circuit comprising:
        i) at least one positively charged and at least one negatively charged bus bar of a second set of bus bars connected to both the generator and the plurality of charge controllers and inverters;
        ii) each of the plurality of charge controllers and inverters operatively connected to a third set of bus bars;
        iii) each of the bus bars of the third set of bus bars electrically connected to a second breaker panel;
        iii) the second breaker panel electrically connected to both the second transfer switch and a third transfer switch; and
    d) the second transfer switch configured to be switched to send power to the first circuit to allow the electric motor to be powered by the plurality of batteries, wherein the second transfer switch can also be switched to the second circuit to allow the electric motor to be powered by the plurality of charge controllers and inverters.

3. The device of claim 2 further comprising:
    a) the first circuit having a safety breaker electrically connected to the plurality of batteries and a positively charged bus bar of a first set of bus bars, wherein the safety breaker can cut power to or from the plurality of batteries;
    b) the first circuit having a relay control electrically connected to the plurality of batteries and a negatively charged bus bar of the first set of bus bars, wherein the relay control is configured to monitor a level of charge of the plurality of batteries; and
    c) the positively charged and negatively charged bus bars of the first set of bus bars being electrically connected to the front inverter.

4. The device of claim 3 further comprising:
    a) the front inverter of the first circuit being electrically connected to a first breaker panel;
    b) the first breaker panel being electrically connected to the second transfer switch, wherein if the second transfer switch is switched to send power from the plurality of batteries to the electric motor, the first breaker panel transfers power to the second transfer switch; and c) the first breaker panel being electrically connected to the first transfer switch, wherein the first breaker panel is configured to send electrical power to a load source.

5. The device of claim 3 further comprising:
a) each of the plurality of charge controllers and inverters being electrically connected to the first set of bus bars.

6. The device of claim 4 further comprising:
a) each of the plurality of charge controllers and inverters being electrically connected to the first set of bus bars.

7. The device of claim 3 further comprising:
a) each of the plurality of charge controllers and inverters being connected to each other in parallel;
b) each of the plurality of charge controllers and inverters being electrically connected to one of a plurality of charge controller and inverter breaker panels, wherein there is one charge controller and inverter breaker panel for each charge controller and inverter; and
c) each charger controller and inverter breaker panel being electrically connected to the third set of bus bars.

8. The device of claim 4 further comprising:
a) each of the plurality of charge controllers and inverters being connected to each other in parallel;
b) each of the plurality of charge controllers and inverters being electrically connected to one of a plurality of charge controller and inverter breaker panels, wherein there is one charge controller and inverter breaker panel for each charge controller and inverter; and
c) each charger controller and inverter breaker panel being electrically connected to the third set of bus bars.

9. The device of claim 5 further comprising:
a) each of the plurality of charge controllers and inverters being connected to each other in parallel;
b) each of the plurality of charge controllers and inverters being electrically connected to one of a plurality of charge controller and inverter breaker panels, wherein there is one charge controller and inverter breaker panel for each charge controller and inverter; and
c) each charger controller and inverter breaker panel being electrically connected to the third set of bus bars.

10. The device of claim 6 further comprising:
a) each of the plurality of charge controllers and inverters being connected to each other in parallel;
b) each of the plurality of charge controllers and inverters being electrically connected to one of a plurality of charge controller and inverter breaker panels, wherein there is one charge controller and inverter breaker panel for each charge controller and inverter; and
c) each charger controller and inverter breaker panel being electrically connected to the third set of bus bars.

11. The device of claim 3 further comprising:
a) each of the plurality of charge controllers and inverters being connected to each other in parallel;
b) each of the plurality of charge controllers and inverters being electrically connected to one of a plurality of charge controller and inverter sub-panels contained in a main breaker box, wherein there is one charge controller and inverter breaker sub-panel for each charge controller and inverter; and
c) each charger controller and inverter breaker sub-panel being electrically connected to the third set of bus bars.

12. The device of claim 4 further comprising:
a) each of the plurality of charge controllers and inverters being connected to each other in parallel;
b) each of the plurality of charge controllers and inverters being electrically connected to one of a plurality of charge controller and inverter sub-panels contained in a main breaker box, wherein there is one charge controller and inverter breaker sub-panel for each charge controller and inverter; and
c) each charger controller and inverter breaker sub-panel being electrically connected to the third set of bus bars.

13. The device of claim 5 further comprising:
a) each of the plurality of charge controllers and inverters being connected to each other in parallel;
b) each of the plurality of charge controllers and inverters being electrically connected to one of a plurality of charge controller and inverter sub-panels contained in a main breaker box, wherein there is one charge controller and inverter breaker sub-panel for each charge controller and inverter; and
c) each charger controller and inverter breaker sub-panel being electrically connected to the third set of bus bars.

14. The device of claim 6 further comprising:
a) each of the plurality of charge controllers and inverters being connected to each other in parallel;
b) each of the plurality of charge controllers and inverters being electrically connected to one of a plurality of charge controller and inverter sub-panels contained in a main breaker box, wherein there is one charge controller and inverter breaker sub-panel for each charge controller and inverter; and
c) each charger controller and inverter breaker sub-panel being electrically connected to the third set of bus bars.

15. The device of claim 11 further comprising:
a) the first transfer switch being configured to transfer power to an electrical power grid when switched.

16. The device of claim 11 further comprising:
a) the third transfer switch being configured to transfer power to an electrical power grid when switched.

17. The device of claim 3 further comprising:
a) the third transfer switch being configured to transfer power to an electrical power grid when switched.

18. The device of claim 3 further comprising:
a) the first transfer switch being configured to transfer power to an electrical power grid when switched.

19. The device of claim 7 further comprising:
a) the third transfer switch being configured to transfer power to an electrical power grid when switched.

20. The device of claim 7 further comprising:
a) the first transfer switch being configured to transfer power to an electrical power grid when switched.

* * * * *